United States Patent
Kim et al.

(10) Patent No.: US 10,436,317 B2
(45) Date of Patent: Oct. 8, 2019

(54) APPARATUS FOR IMPARTING OPERATING FEELING OF GEAR SHIFT MECHANISM

(71) Applicants: Hyundai Motor Company, Seoul (KR); Kia Motors Corp., Seoul (KR)

(72) Inventors: Du Eon Kim, Seoul (KR); Yang Rae Cho, Suwon-si (KR); Min Gi Song, Seoul (KR); Joon Young Park, Suwon-si (KR); Sun Il Kim, Hwaseong-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 4 days.

(21) Appl. No.: 15/669,363

(22) Filed: Aug. 4, 2017

(65) Prior Publication Data
US 2018/0266550 A1    Sep. 20, 2018

(30) Foreign Application Priority Data

Mar. 16, 2017    (KR) .......................... 10-2017-0033167

(51) Int. Cl.
*F16H 59/02*    (2006.01)
*F16H 61/24*    (2006.01)

(52) U.S. Cl.
CPC .......... *F16H 61/24* (2013.01); *F16H 59/0278* (2013.01); *F16H 2061/247* (2013.01)

(58) Field of Classification Search
CPC .................. F16H 61/24; F16H 59/0278; F16H 2061/247; F16H 2061/243
USPC .................................................... 74/473.25
See application file for complete search history.

(56) References Cited

U.S. PATENT DOCUMENTS

| | | | | |
|---|---|---|---|---|
| 5,845,535 A * | 12/1998 | Wakabayashi | ...... | F16H 59/0204 74/473.18 |
| 6,382,045 B1 * | 5/2002 | Wheeler | ................ | F16H 61/24 74/473.12 |
| 7,467,569 B2 * | 12/2008 | Wang | ..................... | F16H 61/24 74/473.21 |
| 7,661,334 B2 * | 2/2010 | Giefer | ..................... | F16H 61/24 74/523 |
| 9,309,962 B2 * | 4/2016 | Matsushita | ............. | F16H 59/02 |
| 2016/0215875 A1 * | 7/2016 | Grennvall | ........... | F16H 59/0204 |

(Continued)

FOREIGN PATENT DOCUMENTS

| | | | | |
|---|---|---|---|---|
| DE | 10160801 A1 * | 6/2003 | ........... | B60Q 1/1469 |
| DE | 102009058719 A1 * | 6/2011 | ........... | B60Q 1/1469 |

(Continued)

*Primary Examiner* — Jake Cook
*Assistant Examiner* — Gregory Robert Weber
(74) *Attorney, Agent, or Firm* — Morgan, Lewis & Bockius LLP

(57) ABSTRACT

An apparatus for imparting an operating feeling of a gear shift mechanism to a driver, may include a housing having an accommodating space, a bullet portion disposed in the accommodating space to operate in a longitudinal direction of the accommodating space, wherein the bullet portion has a head part on an upper portion thereof, and an elastic member disposed between the head part and the accommodating space to operate to allow the bullet portion to be elastically moved in and out of the accommodating space. The head part has a sliding protrusion and the accommodating space has a sliding groove having a shape to correspond to that of the sliding protrusion.

7 Claims, 5 Drawing Sheets

(56) References Cited

U.S. PATENT DOCUMENTS

2016/0305544 A1* 10/2016 TenBrink ............ F16H 59/0204
2016/0319929 A1* 11/2016 Kim ........................ F16H 61/22
2017/0037962 A1* 2/2017 Moreno Colom ...... F16H 61/24
2017/0089458 A1* 3/2017 Schirmer ............ F16H 59/0278

FOREIGN PATENT DOCUMENTS

KR  10-2006-0106630 A     10/2006
WO  WO-2014198293 A1 * 12/2014  ............. F16H 61/22
WO  WO-2016008929 A1 *  1/2016  ............... F16H 1/24

* cited by examiner

APPARATUS FOR IMPARTING OPERATING FEELING OF GEAR SHIFT MECHANISM

CROSS REFERENCE TO RELATED APPLICATION

The present application claims priority to Korean Patent Application No. 10-2017-0033167, filed Mar. 16, 2017, the entire contents of which is incorporated herein for all purposes by this reference.

BACKGROUND OF THE INVENTION

Field of the Invention

The present invention relates to an apparatus that is installed onto a gear shift mechanism in a transmission of a vehicle so as to impart an operating feeling of the gear shift mechanism to a driver during the manipulation of a gear selector of the gear shift mechanism.

Description of Related Art

Generally, a transmission of a vehicle is an apparatus that can convert torque and rotation of an engine in response to driving states and that is classified into a manual transmission, an automatic transmission, a variable transmission, or the like according to types of changing gears. Particularly, when moved and fixed to respective gear stages, a gear selector in an automatic transmission-vehicle imparts an operating feeling to a driver so that he/she can perceive whether or not the gear has been changed. However, poor operability of the gear selector makes it difficult to transmit a driver's gear-change operation to a transmission, which may degrade merchantability of a vehicle.

To improve the operability as well as provide a good operating feeling, a housing for the gear shift mechanism is generally provided with a bullet portion and a groove section. However, conventionally, a gap is generated between an outer diameter of the bullet portion and an inner diameter of an accommodating space of the housing to induce shift-rattling to the gear selector, thereby imparting a bad operating feeling to a driver. Thus, a problem of rattling may occur at the bullet portion that is unloaded.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus for imparting an operating feeling of a gear shift mechanism in a transmission during the manipulation of a gear selector of the gear shift mechanism to improve the operability thereof by removing a gap between a bullet portion and a housing thereof and thus preventing rattling occurring due to the gap during the manipulation of the gear selector.

Various aspects of the present invention are directed to providing an apparatus for imparting an operating feeling of a gear shift mechanism, the apparatus may include a housing having an accommodating space; a bullet portion disposed in the accommodating space to operate in a longitudinal direction of the accommodating space, wherein the bullet portion has a head part on an upper portion thereof; and an elastic member disposed between the head part and the accommodating space to operate to allow the bullet portion to be elastically moved in and out of the accommodating space, wherein the head part of the bullet portion has a sliding protrusion and the accommodating space has a sliding groove having a shape to correspond to that of the sliding protrusion to prevent a gap between the bullet portion and the accommodating space during the operation of the bullet section.

The sliding protrusion may have a taper part that extends radially first and then downwardly such that a width thereof decreases as it goes downwards, and the sliding groove has a taper part having a shape to correspond to the shape of the taper part of the sliding protrusion, so that in operation, the bullet portion is guided by the sliding groove and the sliding protrusion.

The sliding protrusion may include a plurality of sliding protrusions having a predetermined taper angle so that a gap between the bullet portion and the accommodating space is removed during the operation of the bullet section.

The sliding protrusion may extend radially first and then downwards from an upper portion of the head part so that an elastic force is applied during the operation of the bullet section.

The sliding protrusion may have a taper part that extends radially first and then downwardly from the upper portion of the head part so that the taper part becomes closer to the bullet portion as it goes downwards, and the sliding groove has a taper part to correspond to the taper part of the sliding protrusion, so that in operation, the bullet portion is elastically abutted against and supported by the accommodating space by the sliding groove and the sliding protrusion.

The accommodating space may have a stepped stopper on a lower portion thereof, wherein the elastic member is provided such that an upper portion thereof comes into contact with a lower surface of the head part and a lower portion thereof is supported by the stepped stopper, so that when a load applied to the bullet portion is removed, the bullet portion returns to its original position by the elastic force of the elastic member.

The bullet portion may rotate in response to the rotation of the gear selector, wherein a groove portion having a plurality of receiving recesses therein is provided above the accommodating space to cover the accommodating space, so that when the gear selector is rotated, the bullet portion is elastically moved in and out of the accommodating space so that the bullet portion is concurrently moved out of and in the receiving recesses, improving the operability of the gear selector.

The gear selector and the bullet portion may have the same rotary shaft.

According to the apparatus for imparting an operating feeling of the gear shift mechanism, compared to the related art, the number of parts decreases and an excellent articulated operating feature is obtained, having advantages of easy maintenance of parts and saved weight and cost. Further, according to the present invention, it is possible to remove a problem that an excessive stroke during the manipulation of the gear selector causes an elastic force to be applied to the bullet portion itself so that the bullet portion can adhere to the housing, as well as problems of rattling and manipulation force scattering occurring due to a gap between the bullet portion and the housing.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
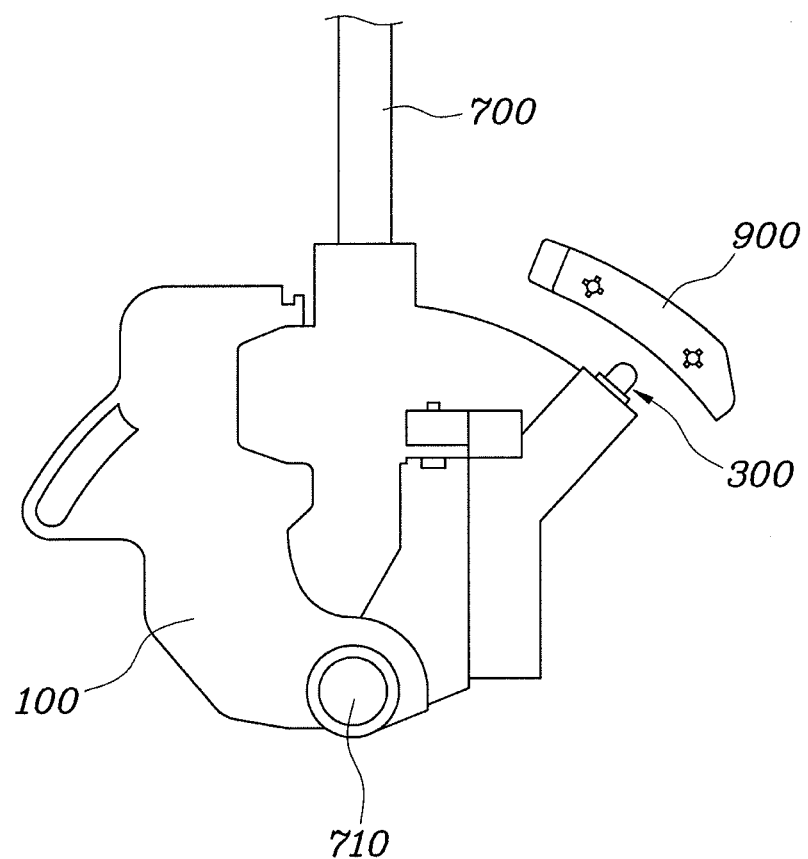
FIG. 1 is a view illustrating a gear shift mechanism according to various exemplary embodiments of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, an apparatus for imparting to a driver an operating feeling of a gear shift mechanism according to exemplary embodiments of the present invention will be described with reference to the accompanying drawings.

Figure 2:
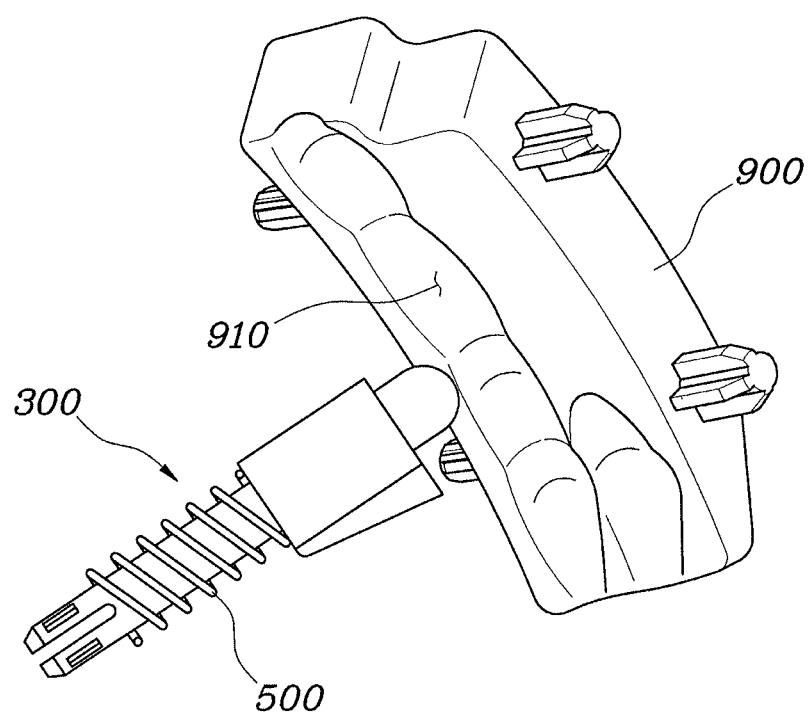
FIG. 2 is a view illustrating a detail of a bullet portion and a groove portion shown in FIG. 1.
Figure 3:
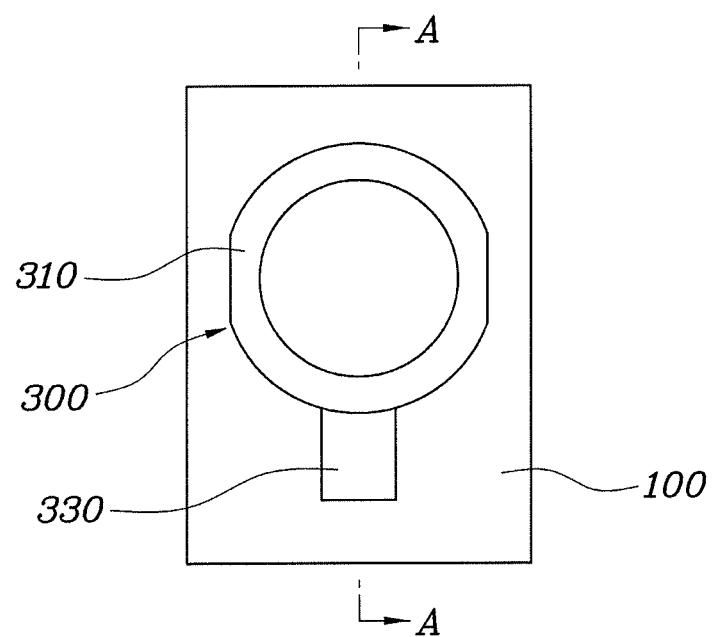
FIG. 3 is a plan view illustrating the state in which the bullet portion is accommodated in an accommodating recess in the gear shift mechanism.
Figure 4:
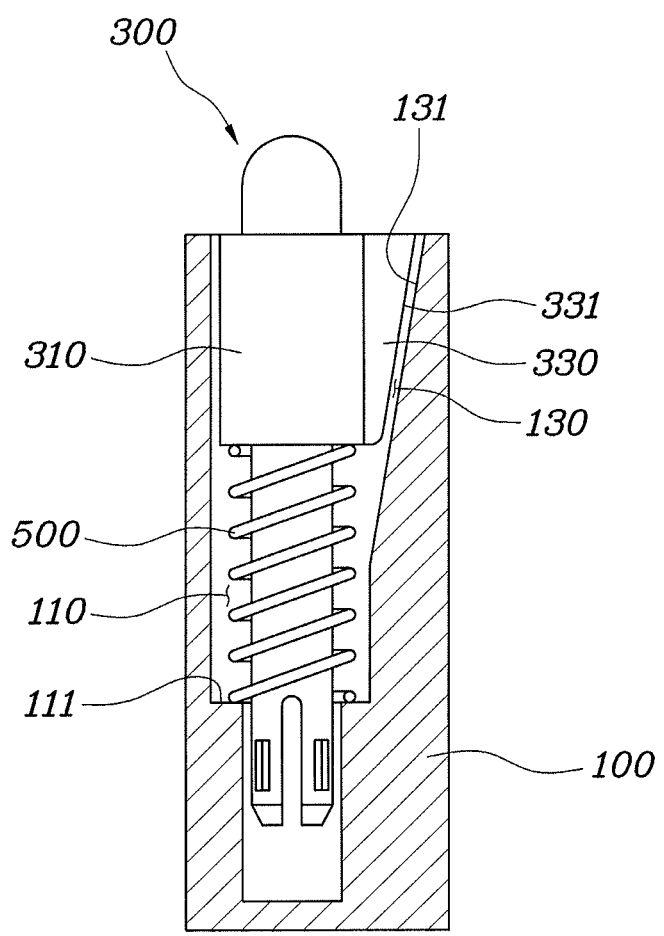
FIG. 4 is a cross-sectional view taken along line A-A in FIG. 3.
Figure 5:
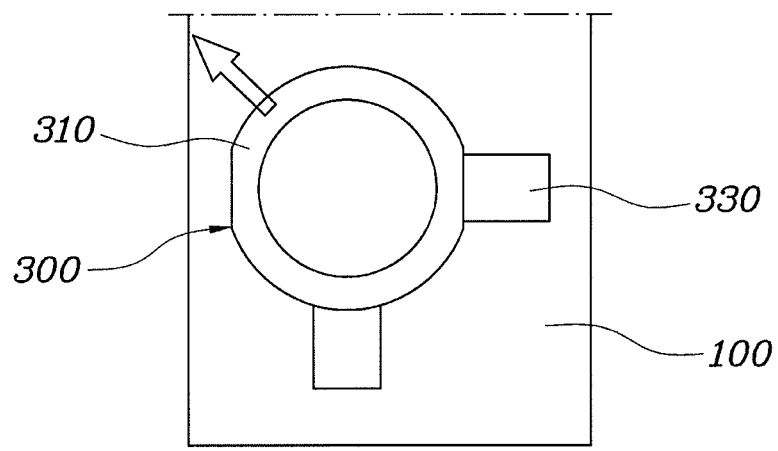
FIG. 5 is a plan view illustrating the state in which a bullet portion is accommodated in an accommodating recess in a gear shift mechanism according to various exemplary embodiments of the present invention.
Figure 6:
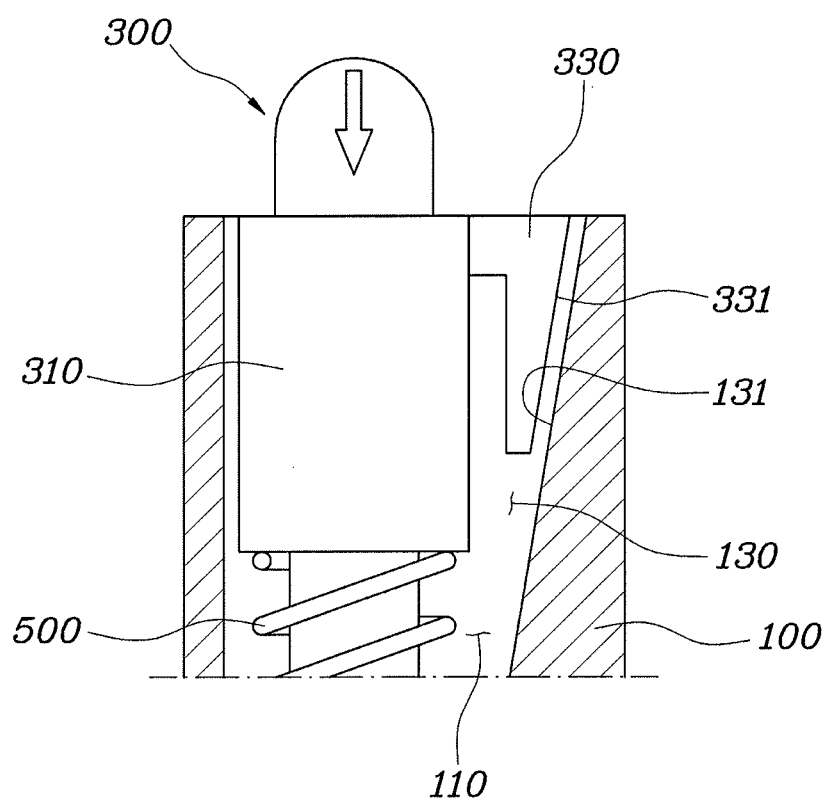
FIG. 6 is a view illustrating a gear shift mechanism according to various exemplary embodiments of the present invention.

FIG. 1 is a view illustrating a gear shift mechanism according to various exemplary embodiments of the present invention and FIG. 2 is a view illustrating a detail of a bullet portion 300 and a groove portion 900 shown in FIG. 1. FIG. 3 is a plan view illustrating the state in which the bullet portion 300 is accommodated in an accommodating recess 110 in the gear shift mechanism, FIG. 4 is a cross-sectional view taken along line A-A in FIG. 3, FIG. 5 is a plan view illustrating the state in which a bullet portion 300 is accommodated in an accommodating recess 110 in a gear shift mechanism according to various exemplary embodiments of the present invention, and FIG. 6 is a view illustrating a gear shift mechanism according to various exemplary embodiments of the present invention.

The apparatus for imparting an operating feeling of a gear shift mechanism to a driver may include a housing 100 having an accommodating space 110; a bullet portion 300 that is disposed in the accommodating space 110 to operate in a longitudinal direction of the accommodating space 110, wherein the bullet portion has a head part 310 on an upper portion thereof; and an elastic member 500 that is disposed between the head part 310 and the accommodating space 110 to operate to allow the bullet portion 300 to be elastically moved in and out of the accommodating space 110. Further, the head part 310 of the bullet portion 300 has a sliding protrusion 330 and the accommodating space 110 has a sliding groove 130 having a shape to correspond to that of the sliding protrusion 330 to prevent a gap between the bullet portion and the housing during the operation of the bullet portion 300. The elastic member 500 may preferably be a coil spring.

The housing 100 may be a housing for a gear shift mechanism to which a gear selector 700 is disposed. Here, the gear selector 700 and the bullet portion 700 may have the same rotary shaft 710 so that the bullet portion 300 can rotate in response to the rotation of the gear selector 700. Further, a groove portion 900 having a plurality of receiving recesses therein is provided above the accommodating space 110 to cover the accommodating space 110. Therefore, when the gear selector 700 is rotated, the bullet portion 300 is elastically moved in and out of the accommodating space 110 so that the bullet portion 300 is concurrently moved out of and in the receiving recesses 910, improving the operability of the gear selector.

The accommodating space 110 of the housing 100 extends longitudinally towards the rotary shaft 710 of the gear selector 700 from a position spaced apart from the gear selector 700, and has a stepped stopper 111 at a lower portion thereof. The bullet portion 300 is disposed in the accommodating space 110 such that the bullet portion can be elastically moved in and out of the accommodating space 110 in the longitudinal direction.

The elastic member 500 is provided around the bullet portion 300 in the accommodating space 110 such that an upper portion thereof comes into contact with the head part 310 of the bullet portion 300 and a lower portion thereof is fixedly supported by the stepped stopper 111 of the accommodating space 110. Thus, in operation of the bullet portion 300, the elastic member 500 enables the bullet portion 300 to be elastically moved in and out of the accommodating space 110, as well as to be fixedly supported in the accommodating space 110. Thus, the elastic member 500 is fixedly disposed between a lower portion of the head part 310 of the bullet portion 300 and the stepped stopper 111 of the accommodating space 110 so that the elastic member is prevented from deviating therebetween, and when a load applied to the bullet portion 300 is released, the elastic member is configured to elastically return the bullet portion 300 to its original position.

As illustrated in FIGS. 2 to 5, the head part 310 of the bullet portion 300 is provided with the circumferential sliding protrusion 330 that has a taper part 331 whose width decreases as it goes downwards. Further, the accommodating space 110 has the corresponding sliding groove 130 that has a taper part 131 to correspond to the taper 331 of the sliding protrusion 330. Thus, in operation, the bullet portion 300 is guided by the sliding groove 130 and the sliding protrusion 330, so that a gap of the bullet portion with the accommodating space is not generated.

As illustrated in FIG. 5, the sliding protrusion 330 is tapered at a predetermined angle, and may include a plurality of sliding protrusions. Then, the sliding groove 130 may also have the same number and shape as those of the sliding protrusion 330. Thus, in operation, the bullet portion 300 compresses the accommodating space 110 in a direction of the arrow shown in FIG. 5, removing a gap between the bullet portion 300 and the accommodating space 110.

Further, as illustrated in FIG. 6, the sliding protrusion 330 may be provided in such a manner as extending radially first and then downwardly from an upper portion of the head part 310. Thus, in operation of the bullet portion 300, an elastic force is applied from the sliding protrusion 330 itself to reduce friction between the accommodating space 110 and the bullet portion 300, reducing the load applied to the bullet portion 300. In various exemplary embodiments of the present invention, the sliding protrusion 330 may have a predetermined taper angle and may include a plurality of sliding protrusions. Thus, the sliding groove 130 may also preferably have the same shape and number as those of the sliding protrusion 330.

Further, the sliding protrusion 330 may have a taper part 331 that extends radially first and then downwardly from the upper portion of the head part 310 so that the taper part becomes closer to the bullet portion 300 as it goes downwards. In addition, the sliding groove 130 may also have a taper part 131 to correspond to the taper part 331 of the sliding protrusion 330. Thus, in operation, the bullet portion 300 is elastically abutted against and supported by the accommodating space 110 by the sliding groove 130 and the sliding protrusion 330.

Thus, when the bullet portion 300 is compressed downwards, the bullet portion 300 receives reacting elastic force of the elastic member 500 so that the taper part 331 of the sliding protrusion 330 comes into contact with the taper part 131 of the sliding groove. That is, the accommodating space 110 and the bullet portion 300 are brought into close contact with each other by the elastic force of the elastic member 500 being applied to the bullet portion to push the accommodating space 110. Here, the reacting force occurring at this time is proportional to a manipulation force of the gear selector 700. Further, even when the bullet portion 300 is gradually moved down, a gap between the accommodating space 110 and the bullet portion 300 is minimized by both taper parts 331 and 131 of the sliding protrusion 330 and the sliding groove 130 whose widths gradually decrease, continuously maintaining a close contact state therebetween. Thus, when the gear selector 700 is manipulated, an effective operating feeling is imparted to a user. When the load applied to the bullet portion 300 is removed, the bullet portion 300 elastically returns to its original position by the elastic force of the elastic member 500, and when the gear selector 700 is manipulated again, the bullet portion is moved along the receiving recesses 910 of the groove portion 900, providing an operating feeling to the user.

According to the apparatus for imparting an operating feeling of the gear shift mechanism, compared to the related art, the number of parts decreases and an excellent articulated operating feature is obtained, having advantages of easy maintenance of parts and saved weight and cost. Further, according to the present invention, it is possible to remove a problem that an excessive stroke during the manipulation of the gear selector causes an elastic force to be applied to the bullet portion itself so that the bullet can adhere to the housing, as well as problems of rattling and manipulation force scattering occurring due to a gap between the bullet portion and the housing.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for imparting an operating feeling of a gear shift mechanism, the apparatus comprising:
   a housing having an accommodating space;
   a bullet portion slidably mounted in the accommodating space to operate in a longitudinal direction of the accommodating space, wherein the bullet portion has a head portion on an upper portion thereof; and
   an elastic member disposed between the head portion and the accommodating space to operate to allow the bullet portion to be elastically moved in and out of the accommodating space during operation of the bullet portion,
   wherein the head portion of the bullet portion has a sliding protrusion and the housing has a sliding groove having an inclined taper part to correspond to that of the sliding protrusion to prevent a gap between the bullet portion and the housing during the operation of the bullet portion, and
   wherein the bullet portion rotates in response to a rotation of a gear selector about a rotary shaft of the gear selector, and wherein a groove portion having a plurality of receiving recesses therein is provided above the accommodating space and the groove portion is configured to cover the accommodating space, so that when the gear selector is rotated, the bullet portion is elastically moved in and out of the accommodating space and an upper end of the bullet portion is concurrently moved out of and in the receiving recesses of the groove portion, improving operability of the gear selector.

2. The apparatus according to claim 1, wherein the sliding protrusion has an inclined taper part that extends radially outward from the bullet portion and then downwardly such that a width of the sliding protrusion decreases as it goes downwards, and the sliding groove has the inclined taper part having a shape to correspond to the shape of the inclined taper part of the sliding protrusion, so that in operation, the bullet portion is guided by the sliding groove and the sliding protrusion.

3. The apparatus according to claim 1, wherein the sliding protrusion includes a plurality of sliding protrusions having a predetermined taper angle so that a gap in a radial direction of the bullet portion between the bullet portion and the accommodating space is removed during the operation of the bullet portion.

4. The apparatus according to claim 1, wherein the sliding protrusion extends radially outward from the bullet portion and then downwards from an upper portion of the head portion so that an elastic force is applied during the operation of the bullet portion.

5. The apparatus according to claim 1, wherein the sliding protrusion has an inclined taper part that extends radially outward from the bullet portion and then downwardly from the upper portion of the head portion so that a lower portion of the taper part becomes closer to the bullet portion as it goes downwards, and the sliding groove has the inclined taper part to correspond to the inclined taper part of the sliding protrusion, so that in operation, the bullet portion is elastically abutted against and supported by the accommodating space by the sliding groove and the sliding protrusion.

6. The apparatus according to claim 1, wherein the accommodating space has a stepped stopper on a lower portion thereof, and wherein the elastic member is provided such that an upper portion thereof contacts with a lower surface of the head portion and a lower portion thereof is supported by the stepped stopper, so that when a load applied to the bullet portion is removed, the bullet portion returns to an original position thereof by the elastic force of the elastic member.

7. The apparatus according to claim 1, wherein the gear selector and the bullet portion are coaxial.

* * * * *